(12) United States Patent
Morse et al.

(10) Patent No.: US 6,896,819 B2
(45) Date of Patent: May 24, 2005

(54) METHOD FOR WATER TREATMENT UTILIZING A LIQUID/VACUUM CYCLONE INTERFACE APPARATUS

(75) Inventors: Dwain E. Morse, 2655 Montrose Pl., Santa Barbara, CA (US) 93105; Wade O. Morse, Santa Barbara, CA (US); Thomas G. Matherly, Lompoc, CA (US)

(73) Assignees: Jerry Friedman, Inglewood, CA (US); Dwain E. Morse, Santa Barbara, CA (US)

( * ) Notice: Subject to any disclaimer, the term of this patent is extended or adjusted under 35 U.S.C. 154(b) by 168 days.

(21) Appl. No.: 10/606,272

(22) Filed: Jun. 24, 2003

(65) Prior Publication Data

US 2004/0026328 A1 Feb. 12, 2004

Related U.S. Application Data

(63) Continuation-in-part of application No. 10/180,216, filed on Jun. 25, 2002.
(60) Provisional application No. 60/300,768, filed on Jun. 25, 2001.

(51) Int. Cl.$^7$ .................................................. C02F 1/38
(52) U.S. Cl. ..................... 210/787; 210/788; 210/188; 95/261
(58) Field of Search ................................ 210/787, 788, 210/188; 95/261

(56) References Cited

U.S. PATENT DOCUMENTS

| | | | | |
|---|---|---|---|---|
| 5,458,738 A | * | 10/1995 | Chamblee et al. | 162/190 |
| 5,470,465 A | * | 11/1995 | Moorehead et al. | 210/205 |
| 6,190,543 B1 | * | 2/2001 | Christiansen | 210/87 |
| 6,602,327 B2 | * | 8/2003 | Morse et al. | 95/261 |
| 6,629,686 B2 | * | 10/2003 | Morse et al. | 261/79.2 |
| 6,663,782 B2 | * | 12/2003 | Morse et al. | 210/703 |

\* cited by examiner

*Primary Examiner*—Betsey Morrison Hoey
(74) *Attorney, Agent, or Firm*—Kelly Lowry & Kelley, LLP

(57) ABSTRACT

A method for treating liquid includes directing a pressurized stream of the liquid into a cyclone apparatus having an inlet closed to the atmosphere and a submerged outlet. A liquid vortex is formed along an inner surface of the cyclone apparatus, and a central portion defined by an inner surface of the liquid vortex is substantially evacuated of gases to create a near vacuum condition. Treatment gas may be selectively added to the liquid vortex through the evacuated central portion. Photon energy may be directed through the evacuated central portion and into contact with the treatment gas, or the liquid vortex. Pressure levels within the evacuated central portion are measured using a pressure sensor or gauge. Upon exiting the cyclone apparatus, the liquid is subjected to collision and cavitation forces.

37 Claims, 4 Drawing Sheets

METHOD FOR WATER TREATMENT UTILIZING A LIQUID/VACUUM CYCLONE INTERFACE APPARATUS

RELATED APPLICATION

This application is a continuation-in-part of U.S. patent application Ser. No. 10/180,216 pending, filed Jun. 25, 2002, which claims priority from U.S. Provisional Application Ser. No. 60/300,768, filed Jun. 25, 2001.

BACKGROUND OF THE INVENTION

The present invention generally relates to the treatment of contaminated liquid such as water. More particularly, the present invention relates to a method of manipulation, removal or addition, and reorganization of dissolved gas volumes in a liquid, and the opportunity to efficiently irradiate the liquid, and in some instances, irradiate low pressure gas additions with photon energy through a generally evacuated low loss pathway.

In the treatment of water, it is often desirable to remove an unwanted dissolved gas, while in other treatment streams, it may be desirable to dissolve a specific gas into a solution. In addition, it is often desired to irradiate a stream of liquid with UV or other photon energies, for disinfection, sterilization, photochemical reaction and the like.

The conventional methods of gas entrainment and gas stripping in a liquid stream suffer a variety of limitations. For instance sparging of gas into a liquid is a method commonly used in low-pressure systems. The inefficiency of sparging is well known. Sparging produces gas bubbles whose excessive size causes rapid flotation out of the water, and even in systems with mechanical mixing means, most sparge gas never entrains into the liquid. Another entrainment method, pressure entrainment, has relatively slow entrainment time due to poor gas/liquid contact, and low mixing energy. In the case of dissolved gas removal, a common method uses an externally applied vacuum pump to lower the gas pressure in a partially filled liquid tank. The dissolved gas is flashed out of solution and then the gas is transferred, utilizing the pump, to a gas scrubber or the like. As gas is removed, its removal rate is limited by the diffusion rate through the liquid. Due to a vacuum forming over a liquid body, and long diffusion time required to degas the liquid, an appreciable amount of the liquid itself may undesirably be evaporated as well.

When photon irradiation of a liquid is desired, conventional devices place UV lamps inside protective sleeves, which assemblies are then immersed in the treatment stream wherein the liquid flows around the tubes. International Publication WO94/02680 entitled HydroCyclone Photo-Reactor discloses such a system. Additionally, U.S. Pat. No. 5,439,595 to Downey, Jr. discloses a similar system wherein UV light is emitted through lenses which are in direct contact with the waste liquid. Well known limitations of these methods are fouling of the lamp protective sleeves, causing low exposure efficiency, and poor positioning of the target contaminates in the liquid solution, causing obscuration or "shadowing" of target organisms and other contaminants in the generally laminar stream flow. This "shadowing" prevents the photon energy reaching desirably irradiated features of the solution, e.g. undesirable microorganisms, toxic compounds and the like. Further, operating efficiency suffers with low energy mixing of the irradiated liquid, wherein the target species are less likely to be positioned into a high photon flux density near the photon source, thus requiring longer exposure times for a given desired photon flux density.

Accordingly, what is needed is an apparatus and method to overcome poor gas transfer rates, low mixing energy, and excessive treatment times provided by the prior art. What is also needed, is a means of photon irradiation of a liquid to maximize photon dose to all liquid constituents while minimizing system power requirements. What is further needed, is a means of in-situ photon irradiation of a low-pressure gas such as oxygen allowing direct ozonation and ingestion into a liquid such as water. The present invention fulfills these needs and provides other related advantages.

SUMMARY OF THE INVENTION

The present invention resides in a method of treating liquid, such as waste water, utilizing a cyclone apparatus which creates a liquid/vacuum interface to facilitate treatment of the liquid such as by adding treatment gases or photon irradiation. The liquid/vacuum cyclone interface of the present invention provides a cost effective and improved means of treating liquid streams such as drinking water, domestic and industrial wastewater, and commercial liquid process streams. The invention uses a unique method of providing both high mechanical mixing energy and access to a liquid interface through a vortex surface that operates at near vacuum pressure. The vacuum vortex may be accessed from the entrance end of the apparatus, providing a means of metering small volumes of gas into the interface. The vacuum vortex may also be accessed from the entrance end to provide a means of irradiating the liquid vortex with photon energy.

The method in accordance with the present invention includes directing a pressurized stream of liquid into a cyclone apparatus having an inlet closed to the atmosphere and a submerged outlet. The cyclone apparatus has a body which is tapered such that the outlet is of smaller cross-sectional area than an upper portion thereof. Typically, the outlet of the cyclone apparatus is defined by a knife edge. A liquid vortex is formed along an inner surface of the cyclone apparatus, and a central portion, defined by an inner surface of the liquid vortex due to the design of the apparatus, is substantially evacuated of gases to create a near vacuum condition within the cyclone apparatus. Upon exiting, the liquid is subjected to collision and cavitation forces.

Pressure levels within the evacuated central portion may be measured using a pressure sensor or gauge which is in communication with the evacuated central portion through a port of the cyclone apparatus. Treatment gas may be selectively added to the liquid vortex through the evacuated central portion, such as through the aforementioned port. Preferably, the treatment gas is added in a metered fashion so as not to disrupt the near vacuum condition of the evacuated central portion.

Photon energy may also be directed through the evacuated central portion and into the liquid vortex. The photon energy is directed into the liquid vortex by means of a photon generator positioned out of contact with the liquid vortex. Due to the near vacuum condition of the central portion, the photon energy is substantially unchanged and at near full power upon striking the inner surface of the liquid vortex. Alternatively, the treatment gas can be irradiated and added to the liquid vortex.

In a particularly preferred embodiment, the photon generator is positioned at an upper end of the cyclone apparatus above the liquid vortex and separated therefrom by a barrier having means for allowing the photon energy to pass therethrough and into the evacuated portion of the liquid vortex. Typically, the photon generator comprises an ultra-violet lamp disposed on the upper end of the cyclone device and having a reflector for focusing the photon energy therefrom through an aperture of the barrier and into the evacuated central portion.

The liquid exiting the apparatus is then subjected to collision and cavitation energies, which provide nucleation and coalescence of gas bubbles. Thus, the liquid vacuum cyclone interface maybe utilized to strip gas from, add gas to, or irradiate with photons the liquid and low-pressure gas passing through the apparatus. Due to its innovative design, the invention allows de-gassing, gas entraining, and photon irradiation of liquid in a small and energy efficient package.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
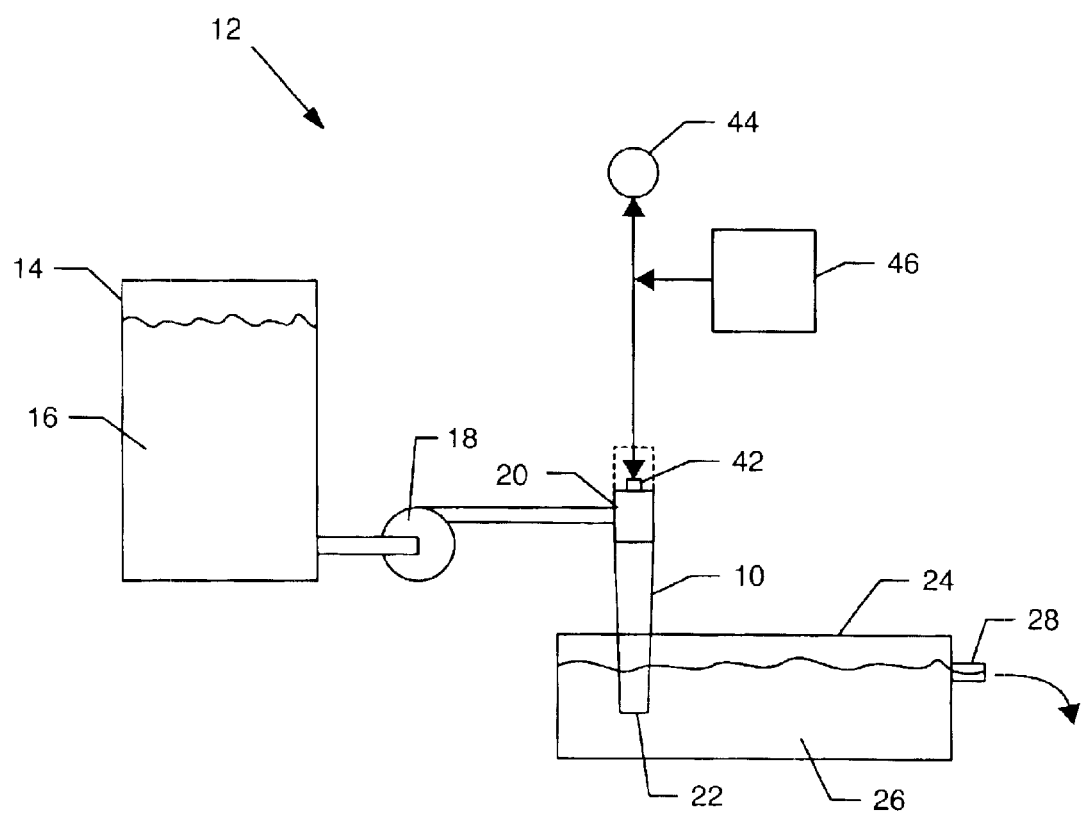
FIG. 1 is a schematic view of a fluid treatment system utilizing the liquid/vacuum cyclone interface apparatus of the present invention.

As shown in the drawings for purposes of illustration, the present invention resides in a method for treating liquid using a cyclone apparatus 10 which is designed and positioned such so as to create a vacuum/liquid stream interface which can be advantageously used to treat the liquid.

With reference now to FIG. 1, the cyclone apparatus 10 is incorporated into a water treatment system 12 that includes a liquid influent tank 14 containing a contaminated liquid 16, usually water. A pump 18 is used to pressurize and direct a stream of the contaminated liquid 16 into an inlet 20 of the cyclone apparatus 10. As will be more fully described herein, the inlet 20 is closed to the atmosphere. An outlet 22 of the cyclone apparatus 10 is submerged into an effluent tank 24. Typically, the exit port or outlet 22 of the cyclone apparatus 10 is submerged a measured distance into effluent liquid 26 within the effluent tank 24. Effluent tank 24 communicates with an effluent tank outlet 28, such that in operation, a generally constant effluent liquid level is maintained inside effluent tank 24. The outlet 28 serves as a weir such that effluent liquid 26 exit the effluent tank 24 upon reaching a certain level. The treated effluent liquid 26 (such as by having gas added thereto, being stripped of undesired gas, or having been irradiated) is then disposed of as required.

Figure 2:
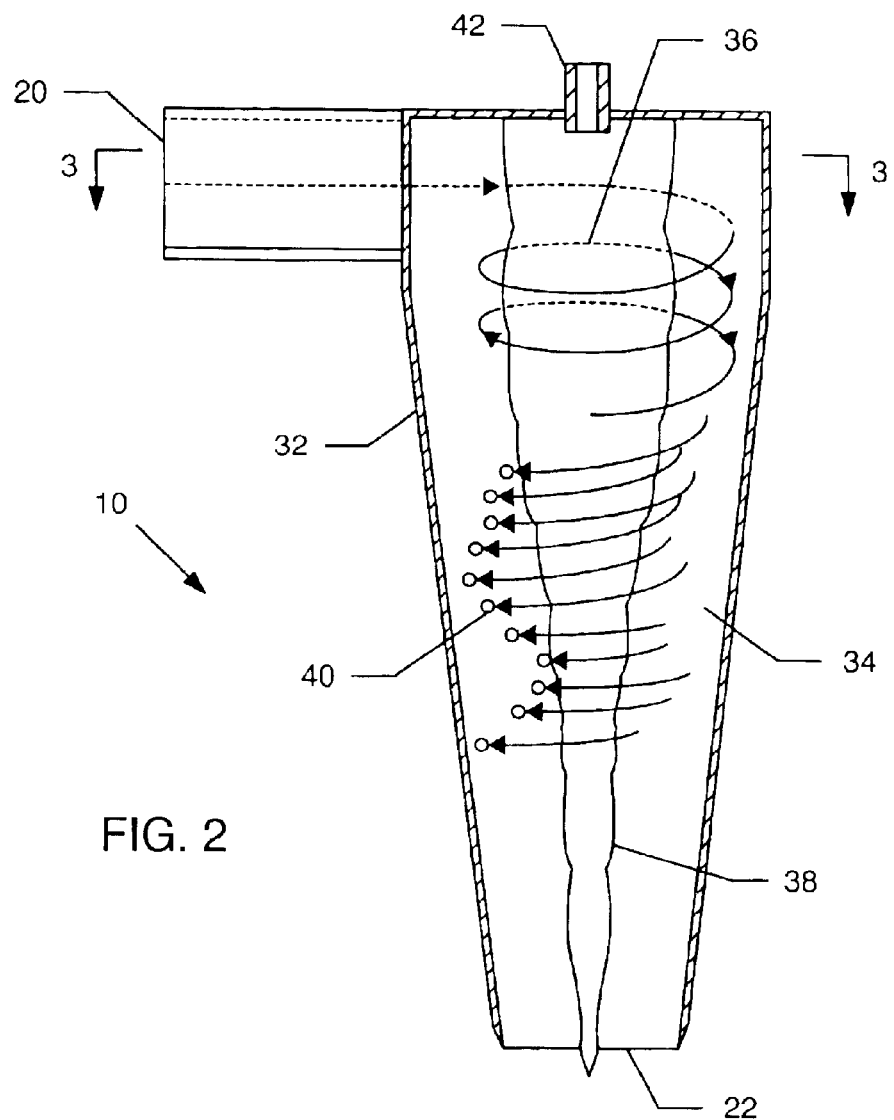
FIG. 2 is a cross-sectional view of the liquid/vacuum cyclone interface apparatus, illustrating a liquid stream vortex and an evacuated central portion formed therein.
Figure 3:
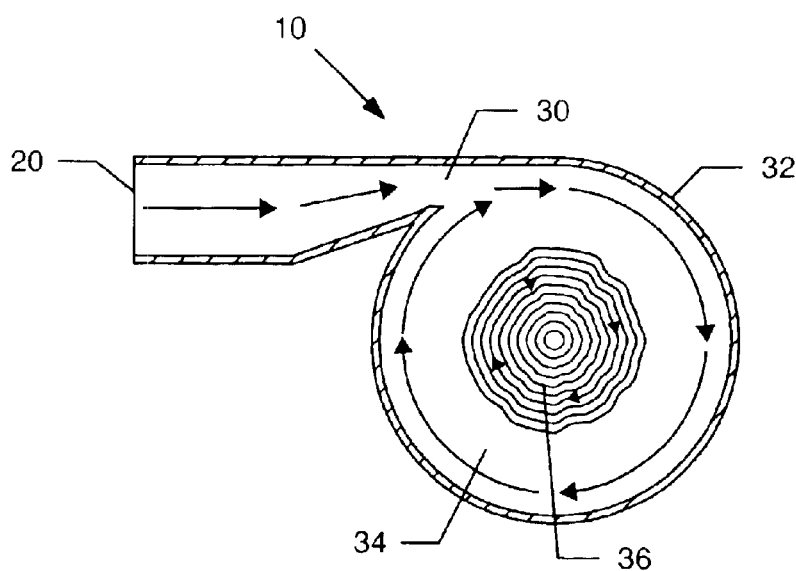
FIG. 3 is a cross-sectional view taken generally along line 3—3 of FIG. 2, illustrating the generation of a liquid cyclone stream within the apparatus.
Figure 4:
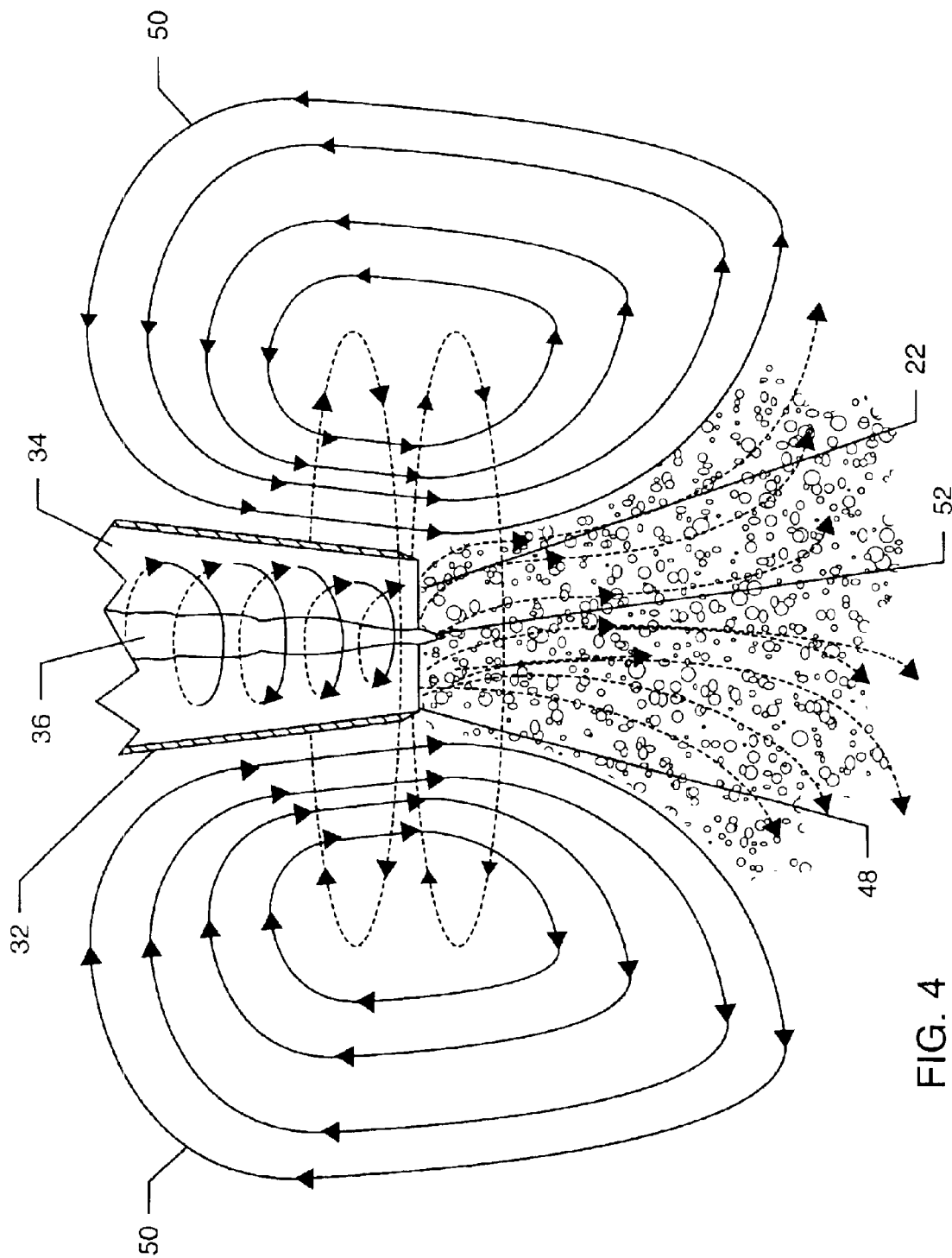
FIG. 4 is a partially fragmented cross-sectional view of an outlet end of the apparatus, illustrating high exit collision energy and sealing liquid flow in accordance with the present invention.

With reference now to FIGS. 2–4, the liquid to be treated 16 is directed into the inlet 20 of the cyclone device 10. As shown in FIG. 3, pressurized contaminated liquid 16 enters the inlet 20 and reaches a cyclone accelerator aperture 30 which is of reduced cross-sectional area with respect to the inlet 20 such that the liquid 16 is caused to increase in linear velocity. The pressurized liquid 16 is tangentially accelerated into a body 32 of the cyclone apparatus 10 such that the pressurized liquid 16 contacts an inner surface of the body at high velocity and is forced into revolution by virtue of being contained by cyclone body 32. The cyclone body 32 is generally tapered such that the cross-sectional diameter of an upper portion thereof is larger than the outlet 22 thereof. Thus, cyclone body 32 contains the liquid in rotational flow, subject to angular momentum, and forms a liquid vortex stream 34.

As the outlet 22 is submerged and the inlet 20 is closed to the atmosphere, a central portion 36 defined by an interior surface 38 is created which is substantially evacuated of gases to create a near vacuum condition. Thus, the geometry of this specialized cyclone apparatus 10 provides a gas eductor, such that the inside surface 38 of the liquid vortex 34 effaces an area evacuated of gas 36. The length of the liquid and vacuum vortex 34 and 36 that forms inside of the apparatus 10 is defined by the length of the cyclone body 32, which is tapered in a decreasing radius away from the inlet aperture 30 and terminates in a smaller cyclone exit port for outlet diameter 22 at a distal end of the cyclone apparatus 10.

The configuration of a liquid/vacuum cyclone interface 38 of the present invention is dependent upon a combination of several defining geometric features and operating parameters.

A first defining feature of the present invention is the cyclone accelerator aperture 30 cross-sectional area, which controls inlet volume per unit time, and accelerator liquid velocity.

A second defining feature of the present invention is the diameter of an upper portion of the cyclone body 32, which controls liquid vortex 34 inlet diameter, and "g" force applied the liquid vortex 34 at inlet diameter at a given inlet velocity. The "g" force (the radial outward force displacing the liquid against the cyclone body 32 interior wall), acting upon the liquid vortex 34 must be sufficient to overcome the radial inward force exerted upon the liquid vortex surface 38 by the low pressure area defining the vacuum vortex 36.

A third defining feature of the present invention is cyclone body 32 length, which in conjunction with cyclone exit port diameter 22 determines the rate at which the inside diameter of the cyclone body 32 is diminished per unit length. The effective taper vs. length maintains the rotational moment of the liquid vortex 34, as the liquid spirals toward the exit port diameter 22. The taper, in this respect, linearizes "g" loading vs. position along the liquid vortex 34. As fluid frictional losses along the cyclone body 32 diminish the velocity of the liquid vortex 34, the gradual decrease in radius forces a gradual increase in liquid angular momentum, overcoming the effect of said frictional losses. This gradual increase in liquid angular momentum maintains "g" loading of the liquid vortex 34, thus preserving the vacuum vortex 36 over the entire cyclone body length 32.

A fourth defining feature of the present invention is the cross-sectional area of cyclone exit port 22. The cross-sectional area of the cyclone exit port 22 determines the velocity of the liquid exiting the apparatus 10. The cross-sectional area must be sufficient to allow the total liquid volume per unit time to exit the apparatus 10, generally filling the cyclone exit port 22, while not being so restrictive as to cause back pressure to develop in the cyclone body 32. Such undesirable back pressure would upset the centrifugally induced vacuum vortex 36, and diminish the efficacy of the invention.

An example of a functioning system utilizes a cyclone body upper diameter of 2.0 inches, a tangential cyclone accelerator aperture 0.7 inches in height and 0.375 inches wide at its narrowest dimension, fed by a 1.0 inch inner diameter cyclone liquid inlet 20. The cyclone body's 32 length is 12.0 inches and the exit port diameter 22 is 1.0 inches. The outlet port 22 of the cyclone apparatus 10 is submerged 10 inches into a effluent liquid tank 24 that is 12 inches wide by 24 inches deep and 5 feet long. A single stage centrifugal pump 18 delivers 50 gallons per minute at 50 psi into the cyclone accelerator aperture 30. A standard vacuum gauge, 0–30 in. hg., is installed on the vacuum interface port 42 (¼ Npt.) The test influent 16 being tap water. In operation, the system 12 provided 29.0–29.3 In. hg. of indicated vacuum inside of the vacuum vortex central area 36, which vortex 36 extended the length of the cyclone body 32 and having a diameter of approximately 0.50 inches. Considerable turbulent flow and bubble evolution were evident in the vortex jet downstream of the outlet 22.

With particular reference to FIG. 2, it is well known in the art that liquid cyclones operating at high rotational speeds and "g" loads generate considerable internal small scale turbulent shear and chaotic flow patterns. Such random translations of individual constituents of the liquid solution flowing through the liquid/vacuum cyclone interface of the present invention aid in the rapid and complete exposure of the total liquid content to the liquid/vacuum interface. A particle 40 is illustrated with a possible route of travel due to the small scale turbulent share and chaotic flow patterns generated in the liquid stream vortex 34. Such particles 40 may be liquid molecules or bonded groups, suspended solids, dissolved gas volumes or the like. The chaotic liquid flow, resulting from random internal cyclone flow patterns, extend into the surface of the liquid vortex 38. This chaotic motion at the liquid/vacuum boundary 38 overcomes the surface tension of the liquid surface, allowing rapid gas transfer and entrainment. Gas molecules distributed within the vacuum vortex 36 are frictionally coupled to the liquid vortex 34 and are centrifugally urged against the inside diameter of the liquid vortex 38.

This coupling mechanism is responsible for the rapid establishment of stable near vacuum pressures at startup, followed by a continuous rearrangement of gas, liquid and suspended solid stream components inside the liquid vortex 34.

In a particularly preferred embodiment, a cyclone vacuum interface port 42 is formed in the cyclone apparatus 10, typically residing along a longitudinal axis of rotation, and provides access to the evacuated central area 36. The vacuum interface port 42 has two primary purposes. The first purpose is to allow measurement of vacuum in the evacuated central area 36 to verify performance, and facilitate system adjustments, such as cyclone liquid inlet pressure and flow adjustments verses vacuum level. This is accomplished by providing a vacuum gauge or sensor 44 which is in communication with the vacuum interface port 42. The vacuum gauge 44 allows monitoring of the operation of the liquid/vacuum cyclone interface 34–38, displaying the vacuum present inside the apparatus 10.

The second purpose of the vacuum interface port 42 is to allow the injection of metered doses of gas from a gas supply 46. The metered gas source 46 provides an accurately defined volume of an additive treatment gas per unit time. Operation of the liquid/vacuum interface apparatus 10 in the injected gas mode allows entrainment of specific gases in appropriate quantities, facilitating such treatment as sterilization. For instance, ozone gas can be dissolved into the liquid stream 34 with high efficiency and low loss. It should be understood that the volume of added gas is sufficient to provide a useful result and treatment, however, the volume of metered gas is restricted to only that volume which may be entrained under the specific operating condition. The aforementioned volume restriction ensures that a usefully low, i.e. near-vacuum, condition exists in the vacuum vortex central portion 36.

With reference now to FIG. 4, an exit portion 22 of the apparatus 10 is shown in cross section. It is assumed that the cyclone exit port 22 is submerged into a body of liquid, such as the effluent tank 24 illustrated in FIG. 1. The liquid stream vortex 34 surrounding the vacuum vortex 36 is shown approaching the exit outlet 22. The cyclone body 32 is tapered to a knife edge 48 at the exit port 22. The knife edge 48 profile provides a release of the liquid vortex stream 34 with minimum boundary layer loading, providing an optimal vortex jet into the bulk water 26. The liquid vortex stream 34 enters the bulk water 26 with a combined axial and rotational moment.

The axial flow component of the liquid vortex 34 is directed away from the cyclone exit port 22 along the longitudinal axis of rotation, while the rotational moment urges the liquid vortex 34 flow into the bulk water 26 with radial vectors orthogonal to the longitudinal axis of rotation. Meanwhile, the vortex jet frictionally induces a circulation of surrounding bulk water, the origin of the circulation being at the cyclone exit port 22, urging a toroidal flow 50 induced into bulk water 26. This toroidal flow pattern 50 includes an axial rotational moment as well, and contains the area of the vortex jet into the bulk water 26. In this discharge area, as the vortex jet collapses, there is a great deal of collision energy and localized pressure drops, which result in cavitation, nucleation of dissolved and distributed micro-volumes of gas, and coalescence of gas bubbles 52. Additionally, the exit dynamic described above provides an effective sealing mechanism, wherein the spin-stabilized frontal pressure wave provided by the exiting vortex jet isolates the vacuum vortex 36 within the cyclone body 32 from the ambient atmospheric pressure acting above the effluent liquid 26.

In essence then, liquid exiting the apparatus collides with downstream bulk liquid, creating a turbulent environment wherein a combination of collision and cavitation energies cause nucleation and coalescence of the perturbed and rearranged gas content of the said liquid. De-entrained gasses are thus released as coalescing bubbles, and floated from the surrounding bulk liquid. In the case that the vacuum environment is fed a suitable volume of a desired gas, the residual dissolved gas balance in the bulk liquid will be altered as well. For example, radical species present in the cavitation area 52 may be forced into desirable chemical reactions with co-mingled contaminants.

Figure 5:
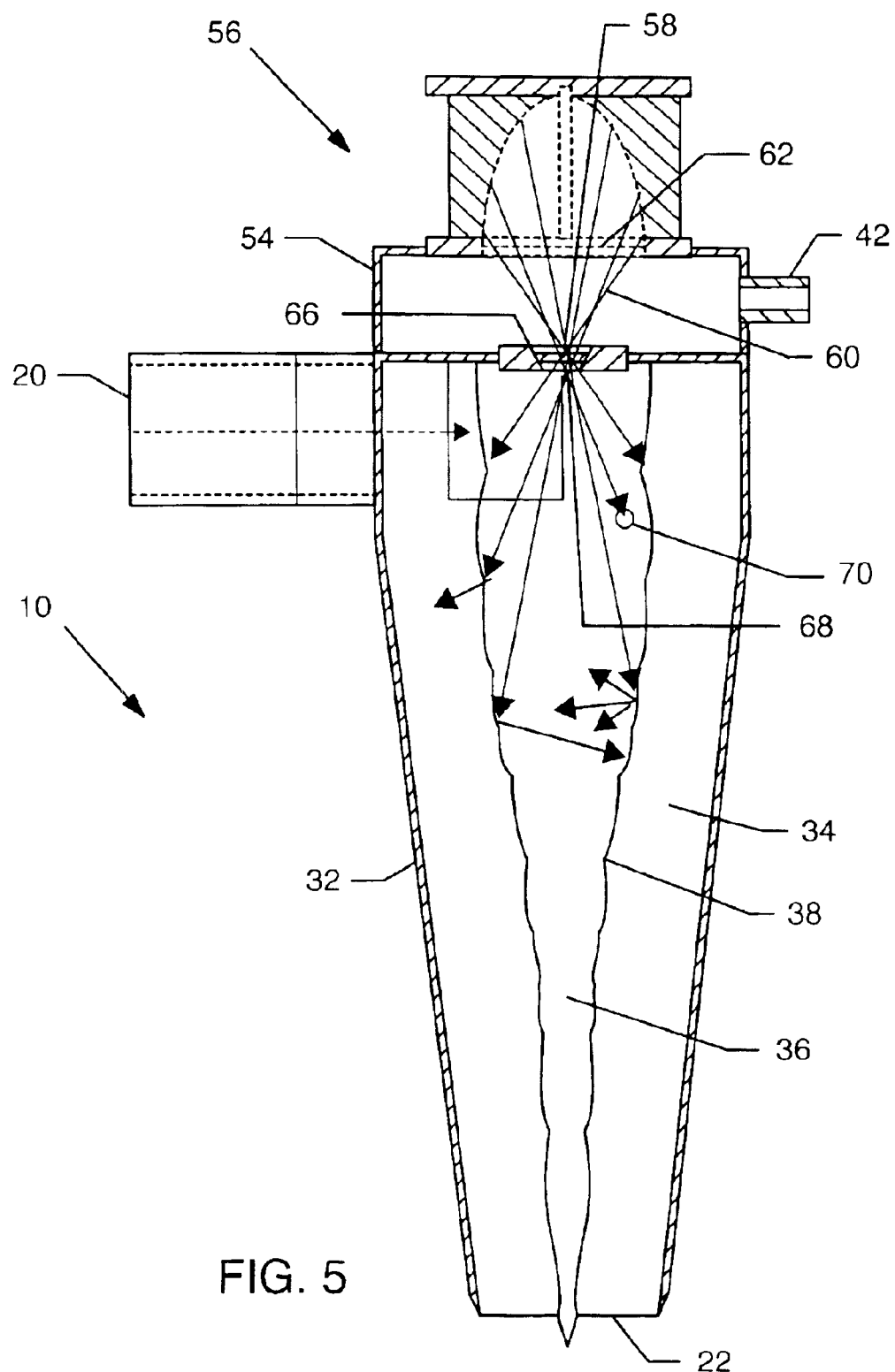
FIG. 5 is yet another cross section view of the longitudinal aspect of the liquid/vacuum cyclone interface wherein the addition of a photon source provides irradiation of the vacuum/liquid interface.

With reference now to FIG. 5, the liquid stream 34 can be irradiated efficiently due to the lack of particles within the evacuated central portion 36. A chamber 54 is formed at an upper end of the body 32. The vacuum interface port 42 extends from a wall of the chamber 54 so that pressure can be measured and gas introduced, as described above. A photon generator 56 is attached to the upper chamber 54 such that photon energy may be directed through the evacuated central portion 36 and into the liquid vortex stream 34. In a particularly preferred embodiment, the photon generator 56 includes an elliptical reflector 58 which focuses a cone of energy 60 along the longitudinal axis of the apparatus 10 and into the evacuated central portion 36. The photon generator 56 includes an optical window 62 arranged to seal the evacuated chamber 56 so as to maintain a vacuum, while allowing the photon energy 60 to travel into the apparatus 10.

In a particularly preferred embodiment, a barrier 64 in the form of a plate is disposed in alignment with the photon generator 56 within a lower wall of the chamber 54. The plate 64 is constructed with a knifed-edge 66 so as to define an aperture 68. This aperture 68 provides a clear passage for focused photon energy 62, and allows equalization of low pressure on either side of the apertured plate. The aperture 68 in the barrier plate 64 also allows gas to be introduced into the evacuated central portion 36, as described above. The height of the evacuated chamber 54 is set to place the focal conjugate of the photon generator 56 at the plane of the aperture barrier plate 64. Such arrangement desirably allows the cone of photon energy 60 to travel into the vacuum vortex 36 through an aperture 68 of minimal size, at the focal conjugate of the photon generator 56. Thus, the plate 64 can provide a barrier blocking the liquid stream 34 from entering the evacuated chamber 54 and into contact with the photon generator 56, while allowing the photon energy cone 60 to pass through its small aperture 68. Thus, contaminated liquid contained in the liquid vortex 34 is prevented from contacting the photon source optical window 62 preventing undesirable attenuation of the photon energy 60, which would be the result of such a fouled optical window.

An exemplary photon generator is the commercially available CERMAX focused xenon arc lamp model EX300-10UV, powered by PSC-300 power supply. The lamp is operated after a stable vacuum vortex 36 has been established, such that the vacuum vortex 36 may be fully illuminated with photon energy in the range of 175 Nm to 1100 Nm.

FIG. 5 further exemplifies the desirable attributes of the present invention by defining the paths and interactions of photon energy inside the vacuum vortex 36. Photon energy 60 originating at photon source 56 is shown as lines terminating in arrows. These lines illustrate possible single photon paths and trajectories. As is well known in the art, such a high-energy source will provide enormous quantities of photons, whose behavior is only definable statistically. Therefore, these lines define a few likely paths and interactions. The lines are shown forming a generally diminishing conical path, said path being of minimum cross sectional area at the focal plane of the aperture plate 64, and defining a focal conjugate. The aperture plate 64 contains a hole 68 with a knife edge chamfer 66, defining an aperture. This aperture edge detail provides minimum interference with and attenuation of the photon energy 60 passing through said aperture 68. Exiting the said aperture plate 64 is a diverging cone of photon energy 60, said energy cone exiting at an angularity equivalent the angularity of the entrance side. Interactions of photons and matter contained the vacuum vortex 36, and matter contained the liquid vortex 34 comprising contaminated water, provide desirable changes to the said matter, providing disinfection, sterilization, photochemical reactions and the like.

One possible interaction is photon energy 60 striking the liquid interface 38 of liquid vortex 34, providing a reaction producing desirable hydroxyl radicals. Such a collision with biological material at the liquid interface 38 may inactivate or destroy microbes. Another possible photon energy 60 collision, may occur with gas molecules 70 within the generally evacuated vacuum vortex 36, or the evacuated chamber 54. If the said gas is oxygen for instance, ozone gas may be produced, which then ingested into the liquid vortex 34 can cause desirable disinfection. Yet another possible photon energy 60 interaction, is the reflection of photon energy 60 back into the vacuum vortex 36, redirecting the photon energy into other desirable collisions. Still another possible photon energy 60 interaction is refraction of photon energy 60 into the liquid vortex 34, passing through the liquid and interacting with a suspended or dissolved liquid feature. The angularity of the entering photon energy 60, and random scattering of photons at the liquid interface 38 due to turbulence of the liquid vacuum interface as disclosed above insure a desirably uniform irradiation of the entire liquid vortex 34 and vacuum vortex 36 of the present invention. These features coupled with the previously described continuous random mixing and positioning of the internal features of the liquid, gas, and dissolved solids, contained the liquid vortex 34 provide a previously unobtainable photon irradiation efficiency.

Although several embodiments have been described in detail for purposes of illustration, various modifications may be made without departing from the scope and spirit of the invention. Accordingly, the invention is not to be limited, except as by the appended claims.

What is claimed is:

1. A method for treating liquid, comprising the steps of:
    directing a stream of liquid into a cyclone apparatus having an inlet closed to the atmosphere and a submerged outlet;
    forming a liquid vortex along an inner surface of the cyclone apparatus; and
    forming a central portion substantially evacuated of gases to create a near vacuum condition within the cyclone apparatus and defined by an inner surface of the liquid vortex.

2. The method of claim 1, including the step of pressurizing the liquid upstream of the cyclone apparatus.

3. The method of claim 1, including the step of subjecting the liquid exiting the cyclone apparatus to collision and cavitation forces.

4. The method of claim 3, wherein the cyclone apparatus includes a tapered body such that the outlet is of a smaller cross-sectional area than an upper portion thereof.

5. The method of claim 4, wherein the outlet of the cyclone apparatus is defined by a knife edge.

6. The method of claim 1, including the step of measuring pressure levels of the evacuated central portion.

7. The method of claim 6, wherein the pressure is measured using a pressure sensor or gauge in communication with the evacuated central portion through a port of the cyclone apparatus.

8. The method of claim 1, including the step of selectively adding treatment gas to the liquid vortex through the evacuated central portion.

9. The method of claim 8, wherein the step of adding treatment gas is performed so as not to disrupt the near vacuum condition of the evacuated central portion.

10. The method of claim 1, including the step of directing photon energy through the evacuated central portion and into the liquid vortex.

11. The method of claim 10, wherein the photon energy is directed into the liquid vortex by means of a photon generator positioned out of contact with the liquid vortex.

12. The method of claim 11, wherein the photon generator is positioned at an upper end of the cyclone apparatus above the liquid vortex and separated therefrom by a barrier having means for allowing the photon energy to pass therethrough and into the evacuated portion and liquid vortex.

13. The method of claim 12, wherein the photon generator comprises an ultraviolet lamp disposed on the upper end of the cyclone device and including a reflector for focusing the photon energy therefrom through an aperture of the barrier and into the evacuated central portion and into the liquid vortex.

14. A method for treating liquid, comprising the steps of:
directing a pressurized stream of liquid into a cyclone apparatus having an inlet closed to the atmosphere and a submerged outlet, the cyclone having a body which is tapered such that the outlet is of smaller cross-sectional area than an upper portion thereof;
forming a liquid vortex along an inner surface of the cyclone apparatus;
forming a central portion substantially evacuated of gases to create a near vacuum condition within the cyclone apparatus and defined by an inner surface of the liquid vortex; and
subjecting the liquid exiting the cyclone apparatus to collision and cavitation forces.

15. The method of claim 14, wherein the outlet of the cyclone apparatus is defined by a knife edge.

16. The method of claim 14, including the step of measuring pressure levels within the evacuated central portion using a pressure sensor or gauge in communication with the evacuated central portion through a port of the cyclone apparatus.

17. The method of claim 14, including the step of selectively adding treatment gas to the liquid vortex through the evacuated central portion.

18. The method of claim 17, wherein the step of adding treatment gas is performed so as not to disrupt the near vacuum condition of the evacuated central portion.

19. The method of claim 14, including the step of directing photon energy through the evacuated central portion and into the liquid vortex.

20. The method of claim 19, wherein the photon energy is directed into the liquid vortex by means of a photon generator positioned out of contact with the liquid vortex.

21. The method of claim 20, wherein the photon generator is positioned at an upper end of the cyclone apparatus above the liquid vortex and separated therefrom by a barrier having means for allowing the photon energy to pass therethrough and into the evacuated portion and liquid vortex.

22. The method of claim 21, wherein the photon generator comprises an ultraviolet lamp disposed on the upper end of the cyclone device and including a reflector for focusing the photon energy therefrom through an aperture of the barrier and into the evacuated central portion and into the liquid vortex.

23. A method for treating liquid, comprising the steps of:
directing a pressurized stream of liquid into a cyclone apparatus having an inlet closed to the atmosphere and a submerged outlet, the cyclone having a body which is tapered such that the outlet is of smaller cross-sectional area than an upper portion thereof;
forming a liquid vortex along an inner surface of the cyclone apparatus;
forming a central portion substantially evacuated of gases to create a near vacuum condition within the cyclone apparatus and defined by an inner surface of the liquid vortex; and
selectively adding treatment gas to the liquid vortex through the evacuated central portion so as not to disrupt the near vacuum condition of the evacuated central portion.

24. The method of claim 23, including the step of subjecting the liquid exiting the cyclone apparatus to collision and cavitation forces.

25. The method of claim 23, wherein the outlet of the cyclone apparatus is defined by a knife edge.

26. The method of claim 23, including the step of measuring pressure levels within the evacuated portion using a pressure sensor or gauge in communication with the evacuated central portion through a port of the cyclone apparatus.

27. The method of claim 23, including the step of directing photon energy through the evacuated central portion and into the liquid vortex by means of a photon generator positioned out of contact with the liquid vortex.

28. The method of claim 27, wherein the photon generator is positioned at an upper end of the cyclone apparatus above the liquid vortex and separated therefrom by a barrier having means for allowing the photon energy to pass therethrough and into the evacuated portion and liquid vortex.

29. The method of claim 28, wherein the photon generator comprises an ultraviolet lamp disposed on the upper end of the cyclone device and including a reflector for focusing the photon energy therefrom through an aperture of the barrier and into the evacuated central portion and into the liquid vortex.

30. A method for treating liquid, comprising the steps of:
directing a pressurized stream of liquid into a cyclone apparatus having an inlet closed to the atmosphere and a submerged outlet, the cyclone having a body which is tapered such that the outlet is of smaller cross-sectional area than an upper portion thereof;
forming a liquid vortex along an inner surface of the cyclone apparatus; and
forming a central portion substantially evacuated of gases to create a near vacuum condition within the cyclone apparatus and defined by an inner surface of the liquid vortex; and
directing photon energy through the evacuated central portion and into the liquid vortex by means of a photon generator positioned out of contact with the liquid vortex.

31. The method of claim 30, including the step of subjecting the liquid exiting the cyclone apparatus to collision and cavitation forces.

32. The method of claim 30, wherein the outlet of the cyclone apparatus is defined by a knife edge.

33. The method of claim 30, including the step of measuring pressure levels of the evacuated central portion using a pressure sensor or gauge in communication with the evacuated central portion through a port of the cyclone apparatus.

34. The method of claim 30, including the step of selectively adding treatment gas to the liquid vortex through the evacuated central portion.

35. The method of claim 34, wherein the step of adding treatment gas is performed so as not to disrupt the near vacuum condition of the evacuated central portion.

36. The method of claim 30, wherein the photon generator is positioned at an upper end of the cyclone apparatus above the liquid vortex and separated therefrom by a barrier having means for allowing the photon energy to pass therethrough and into the evacuated portion and liquid vortex.

37. The method of claim 36, wherein the photon generator comprises an ultraviolet lamp disposed on the upper end of the cyclone device and including a reflector for focusing the photon energy therefrom through an aperture of the barrier and into the evacuated central portion and into the liquid vortex.

* * * * *